United States Patent
Kim et al.

(10) Patent No.: US 9,694,680 B2
(45) Date of Patent: Jul. 4, 2017

(54) SYSTEM AND METHOD FOR DETERMINING DROWSY STATE OF DRIVER

(71) Applicant: Hyundai Motor Company, Seoul (KR)

(72) Inventors: Jin Kwon Kim, Gyeonggi-do (KR); Byoung Joon Lee, Gyeonggi-do (KR); Hwal Ly Lee, Seoul (KR); Ho Choul Jung, Gyeonggi-do (KR); Sam Yong Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 11 days.

(21) Appl. No.: 14/752,964

(22) Filed: Jun. 28, 2015

(65) Prior Publication Data

US 2016/0159217 A1    Jun. 9, 2016

(30) Foreign Application Priority Data

Dec. 8, 2014    (KR) .................... 10-2014-0175087

(51) Int. Cl.
*G08B 23/00* (2006.01)
*B60K 28/06* (2006.01)
*G08B 21/06* (2006.01)

(52) U.S. Cl.
CPC ............ *B60K 28/066* (2013.01); *G08B 21/06* (2013.01)

(58) Field of Classification Search
CPC .......... B60W 2040/0818; G08B 21/06; B60K 28/06; G06K 9/00845
USPC ...... 340/575, 576, 439, 573.1; 180/272, 280
See application file for complete search history.

(56) References Cited

U.S. PATENT DOCUMENTS

| | | | |
|---|---|---|---|
| 4,611,199 A | 9/1986 | Seko et al. | |
| 5,574,641 A * | 11/1996 | Kawakami | G08B 21/06 180/272 |
| 6,049,747 A * | 4/2000 | Nakajima | B60N 2/002 340/576 |
| 6,104,296 A * | 8/2000 | Yasushi | A61B 5/04085 180/272 |
| 7,206,631 B2 | 4/2007 | Kawachi et al. | |
| 7,982,618 B2 | 7/2011 | Omi et al. | |

(Continued)

FOREIGN PATENT DOCUMENTS

| | | |
|---|---|---|
| JP | S59153627 A | 9/1984 |
| JP | S6012341 A | 1/1985 |

(Continued)

*Primary Examiner* — Phung Nguyen
(74) *Attorney, Agent, or Firm* — Mintz Levin Cohn Ferris Glovsky and Popeo, P.C.; Peter F. Corless

(57) ABSTRACT

A system for determining a drowsy state of a driver includes: a heartbeat measurement module configured to detect a heartbeat rate of the driver and output a heartbeat signal corresponding to the detected heartbeat rate; a vehicle signal measurement module configured to measure a driving state of a vehicle being driven by the driver and output a vehicle signal corresponding to the measured driving state; a drowsy pattern detection module configured to determine whether a driver has fallen asleep while driving based on the heartbeat signal and the vehicle signal and output a warning signal as a drowsy warning in response to determining that the driver has fallen asleep while driving; and a warning module configured to output a warning to the driver based on the warning signal.

13 Claims, 4 Drawing Sheets

(56) References Cited

U.S. PATENT DOCUMENTS

| | | | | |
|---|---|---|---|---|
| 8,289,172 | B2* | 10/2012 | Matos | A62B 99/00 |
| | | | | 340/576 |
| 8,593,288 | B2 | 11/2013 | Schmitz et al. | |
| 9,542,847 | B2* | 1/2017 | Sherony | G08G 1/167 |
| 2004/0051642 | A1* | 3/2004 | Choi | G08B 21/06 |
| | | | | 340/575 |
| 2007/0222617 | A1* | 9/2007 | Chai | B60W 40/09 |
| | | | | 340/573.1 |
| 2012/0105234 | A1* | 5/2012 | Oguri | A61B 5/18 |
| | | | | 340/576 |
| 2014/0097957 | A1* | 4/2014 | Breed | G08B 21/06 |
| | | | | 340/576 |

FOREIGN PATENT DOCUMENTS

| | | | |
|---|---|---|---|
| JP | 2002-183900 | A | 6/2002 |
| KR | 10-1997-0010575 | B1 | 6/1997 |
| KR | 10-2012-0048981 | A | 5/2012 |
| KR | 10-1311552 | B1 | 9/2013 |

\* cited by examiner

US 9,694,680 B2

SYSTEM AND METHOD FOR DETERMINING DROWSY STATE OF DRIVER

CROSS-REFERENCE TO RELATED APPLICATION

This application claims the benefit of and priority to Korean Patent Application No. 10-2014-0175087, filed on Dec. 8, 2014 in the Korean Intellectual Property Office, the disclosure of which is incorporated herein in its entirety by reference.

TECHNICAL FIELD

The present disclosure relates generally to a system and a method for determining a drowsy state of a driver, and more particularly, to a system and a method for more accurately determining a drowsy state of a driver using a vehicle signal acquired from a vehicle based on a heartbeat signal of the driver or an image signal for the driver.

BACKGROUND

Since one of the biggest causes of traffic accidents is drowsy driving, many methods for preventing drowsy driving have been researched recently. Conventional technology of determining drowsiness of a driver includes photographing a motion of the driver's pupils using a vehicle signal (e.g., steering signal, width position in a lane using a camera, etc.), photographing the motion of the driver's pupils using a camera photographing a driver, and detecting an opening and closing interval of eyes.

However, it is difficult for the vehicle signal to distinguish between intentional vehicle behavior (i.e., intentionally erratic driving or driving in response to a sudden change in surrounding environment) and driving patterns due to drowsiness. It is also difficult for a driver image-based scheme to accurately determine fatigue drowsiness based on the recognized opening and closing of the driver's eyes in certain photo-environments and during unexpected conditions, such as when wearing glasses and laughing.

SUMMARY

The present disclosure has been made to solve the above-mentioned problems occurring in the related art while advantages achieved by the related art are maintained intact.

An aspect of the present disclosure provides a system and a method for more accurately determining a drowsy state of a driver using a vehicle signal, an image signal, and a heartbeat signal of the driver.

According to embodiments of the present disclosure, a system for determining a drowsy state of a driver includes: a heartbeat measurement module configured to detect a heartbeat rate of the driver and output a heartbeat signal corresponding to the detected heartbeat rate; a vehicle signal measurement module configured to measure a driving state of a vehicle being driven by the driver and output a vehicle signal corresponding to the measured driving state; a drowsy pattern detection module configured to determine whether a driver has fallen asleep while driving based on the heartbeat signal and the vehicle signal and output a warning signal as a drowsy warning in response to determining that the driver has fallen asleep while driving; and a warning module configured to output a warning to the driver based on the warning signal.

The drowsy pattern detection module may be further configured to output the warning signal when an indication that a level of steering is less than a preset level appears in a state in which the heartbeat rate of the driver is less than a preset level and then is suddenly increased greater than the preset level and the level of steering is greater than the preset level.

The drowsy pattern detection module may be further configured to output the warning signal regardless of the vehicle signal when the heartbeat rate of the driver is suddenly increased greater than the preset level and the level of steering is greater than the preset level and then the heartbeat rate is again reduced less than a preset numeric value.

The drowsy pattern detection module may be further configured to output the warning signal when a zigzag pattern appears due to a lane tracking failure in a state in which the heartbeat rate of the driver is less than a preset level and then a normal pattern of tracking a lane appears while the heartbeat rate is suddenly increased greater than the preset level.

The drowsy pattern detection module may be further configured to output the warning signal regardless of the vehicle signal when the driver normally tracks the lane while the heartbeat rate of the driver is suddenly increased greater than the preset level and then the heartbeat rate is again reduced less than a preset numeric value.

Furthermore, according to embodiments of the present disclosure, a system for determining a drowsy state of a driver includes: a heartbeat measurement module configured to detect a heartbeat rate of the driver and output a heartbeat signal corresponding to the detected heartbeat rate; a driver photographing module configured to measure a degree of eye closing of the driver and output an eye closing signal indicating the measured eye closing degree; a drowsy pattern detection module configured to determine whether the driver has fallen asleep while driving based on the heartbeat signal and the eye closing signal and output a warning signal as a drowsy warning in response to determining that the driver has fallen asleep while driving; and a warning module configured to output a warning to the driver based on the warning signal.

The drowsy pattern detection module may be further configured to output the warning signal when a long eye closing pattern is greater than a preset frequency in a state in which the heartbeat rate of the driver is less than a preset level and then the long eye closing pattern disappears while the heartbeat rate is suddenly increased greater than the preset level.

The drowsy pattern detection module may be further configured to output the warning signal regardless of a vehicle signal when the long eye closing pattern disappears while the heartbeat rate of the driver is suddenly increased greater than the preset level and then the heartbeat rate is again reduced less than a preset numeric value.

Furthermore, according to embodiments of the present disclosure, a method for determining a drowsy state of a driver includes: measuring a heartbeat rate of the driver and a driving state of a vehicle being driven by the driver; determining whether the driver has fallen asleep while driving based on the heartbeat rate and the driving state; and outputting a warning when it is determined that the driver has fallen asleep while driving.

The determining of whether the driver has fallen asleep while driving may include: determining that the driver has fallen asleep while driving when an indication that a level of steering is less than a preset level appears in a state in which the heartbeat rate of the driver is less than a preset level and then is suddenly increased greater than the preset level and the level of steering is greater than the preset level.

The determining of whether the driver has fallen asleep while driving may include: determining that the driver has fallen asleep while driving when a zigzag pattern appears due to a lane tracking failure in a state in which the heartbeat rate of the driver is less than a preset level and then a normal pattern of tracking a lane appears while the heartbeat rate is suddenly increased greater than the preset level.

The measuring may include: photographing eyes of the driver and outputting a photographed image signal corresponding to the photographed eyes; and analyzing the photographed image signal to measure an eye closing degree of the driver.

The determining of whether the driver has fallen asleep while driving may include: determining that the driver has fallen asleep while driving when a long eye closing pattern is greater than a preset frequency in a state in which the heartbeat rate of the driver is less than a preset level and then the long eye closing pattern disappears while the heartbeat rate is suddenly increased greater than the preset level.

Furthermore, according to embodiments of the present disclosure, a non-transitory computer readable medium containing program instructions for determining a drowsy state of a driver, the computer readable medium comprising: program instructions that measure a heartbeat rate of the driver and a driving state of a vehicle being driven by the driver; program instructions that determine whether the driver has fallen asleep while driving based on the heartbeat rate and the driving state; and program instructions that output a warning when it is determined that the driver has fallen asleep while driving.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
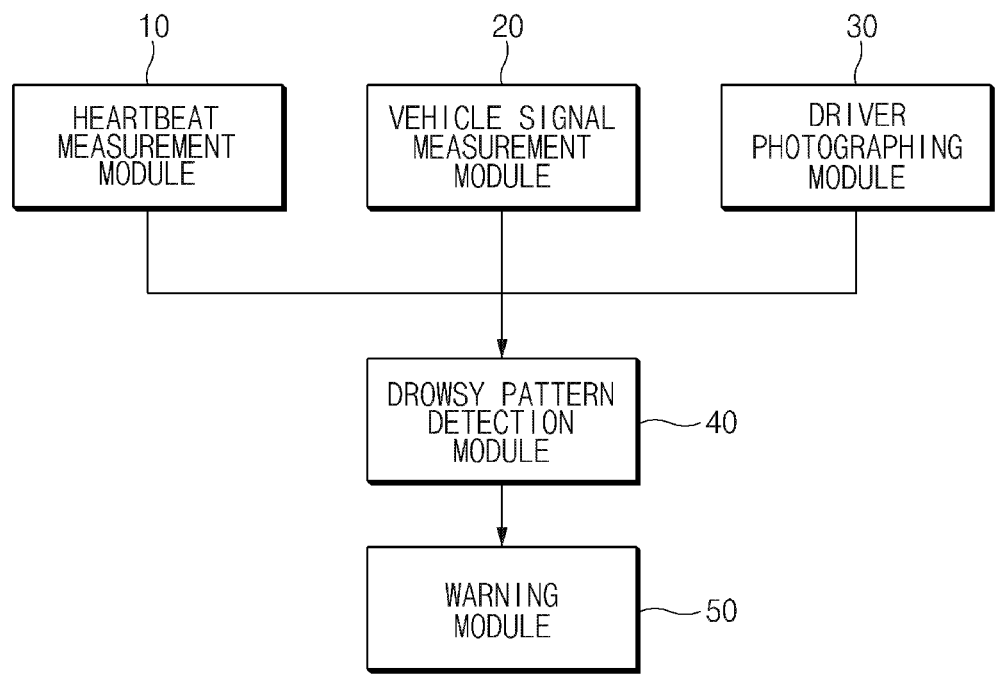
FIG. 1 is a configuration diagram illustrating a configuration of a system for determining a drowsy state of a driver according to embodiments of the present disclosure.

Hereinafter, embodiments of the present disclosure will be described in detail with reference to the accompanying drawings. Terms and words used in the present specification and claims are not to be construed as a general or dictionary meaning, but are to be construed as meaning and concepts meeting the technical ideas of the present disclosure based on a principle that the present inventors may appropriately define the concepts of terms in order to describe their disclosures in best mode. Therefore, configurations described in embodiments and the accompanying drawings of the present disclosure do not represent all of the technical spirits of the present disclosure, but are merely disclosed embodiments. Therefore, the present disclosure should be construed as including all the changes, equivalents, and substitutions included in the spirit and scope of the present disclosure at the time of filing this application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the control logic employed in executing the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a configuration diagram illustrating a configuration of a system for determining a drowsy state of a driver according to embodiments of the present disclosure.

The system for determining a drowsy state of a driver of FIG. 1 may include a heartbeat measurement module 10, a vehicle signal measurement module 20, a driver photographing module 30, a drowsy pattern detection module 40, and a warning module 50.

The heartbeat measurement module 10 detects a heartbeat rate (i.e., pulse rate) of a driver and transmits a heartbeat signal corresponding to the detected heartbeat rate to the drowsy pattern detection module 40. The heartbeat measurement module 10 may be formed in a wearable form or a form which is mounted in a vehicle. For example, the heartbeat measurement module 10 may include a plurality of electrodes which are installed on a steering wheel. When a right hand and a left hand of a driver each contact the electrodes, a potential difference corresponding to a heart potential of a driver is generated between two electrodes. In this case, the heartbeat measurement module 10 may detect the potential difference generated between the two electrodes to acquire the heartbeat signal of the driver. Alternatively, a pulse wave sensor having a shape such as a wristwatch and a ring may be installed in the driver to detect the heartbeat signal (signal corresponding to the heartbeat signal).

The vehicle signal measurement module 20 uses various sensors (e.g., steering sensor, torque sensor, and the like) which are installed in the vehicle to measure a driving state of a vehicle and transmit the measured result to the drowsy pattern detection module 40. For example, the vehicle signal measurement module 20 measures a steering angle (i.e., steering degree) of the vehicle, the width position of the vehicle, and the like to transmit a signal (i.e., vehicle signal) informing a driving state of the vehicle to the drowsy pattern detection module 40.

The driver photographing module 30 uses an imaging apparatus such as a camera to photograph a driver's face, in particular, eyes and analyzes a photographed image signal to transmit a signal (i.e., eyes closing signal) indicating how much driver's eyes are closed to the drowsy pattern detection module 40.

The drowsy pattern detection module 40 uses the heartbeat signal received from the heartbeat measurement module 10, the vehicle signal received from the vehicle signal measurement module 20, or the eyes closing signal received from the driver photographing module 30 to detect the drowsy state of the driver and output a warning signal to the driver based on the detected result.

The warning module 50 outputs a warning to the driver depending on the warning signal from the drowsy pattern detection module 40. For example, the warning module 50 outputs a warning sound or a speech signal recommending rest, vibrates a seat or a steering wheel, or controls an air conditioner of a vehicle to help a driver get out of a drowsy state.

Figure 2:
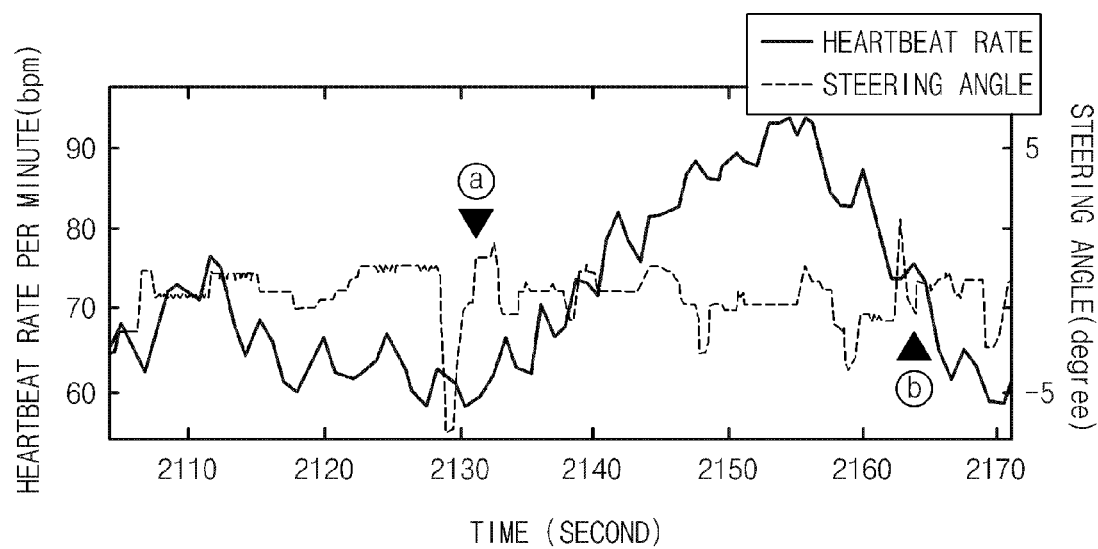
FIGS. 2 to 4 are diagrams for describing a method for determining a drowsy state of a driver for each situation.
Figure 3:
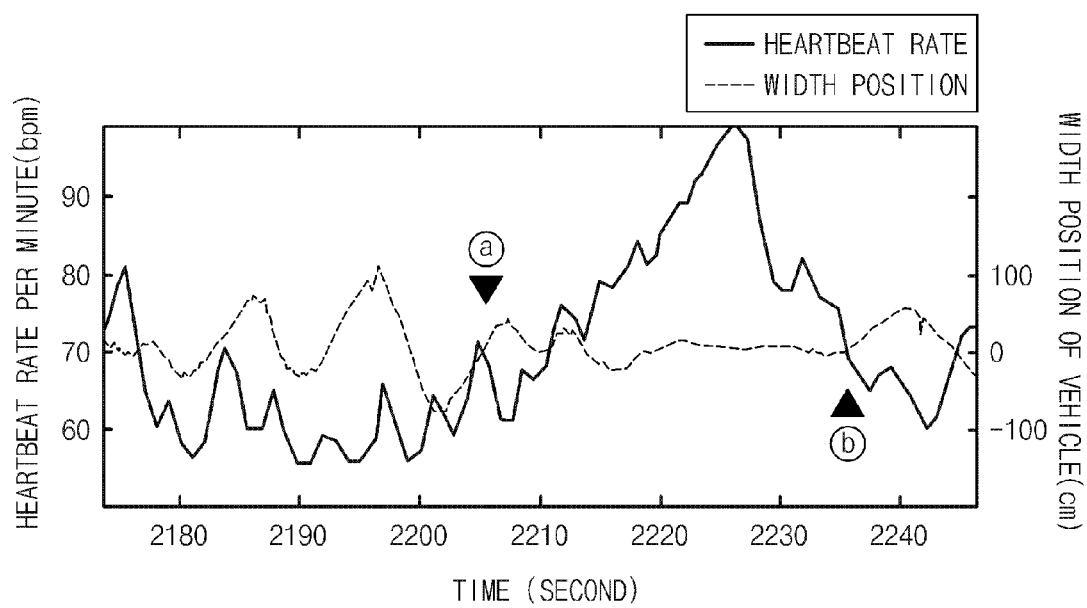
Figure 4:
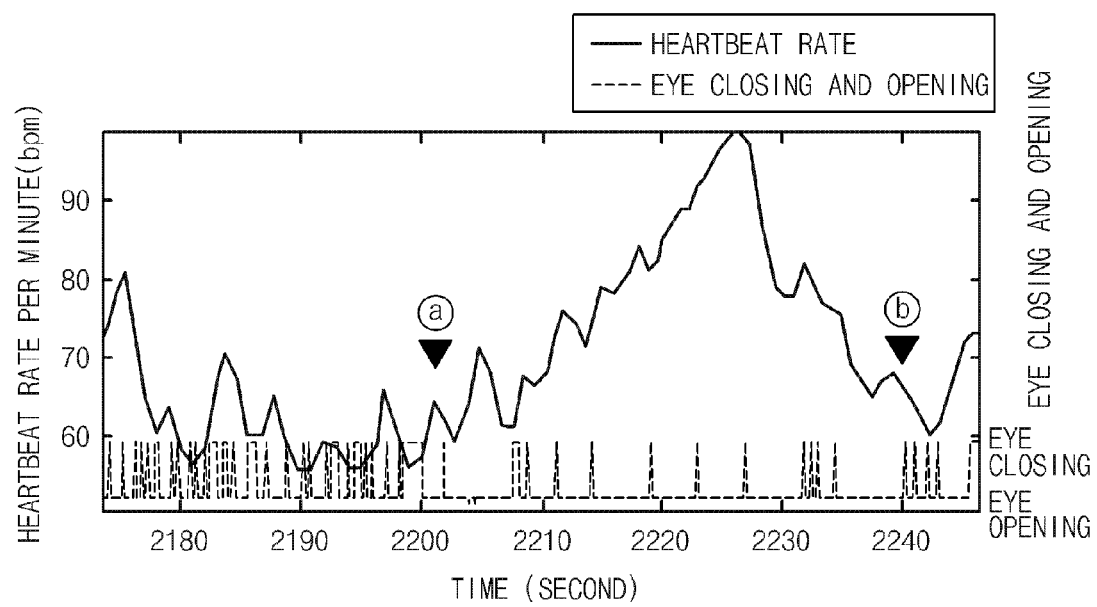

FIGS. 2 to 4 are drawings for describing a method for determining a drowsy state of a driver for each situation, in which a method for determining a drowsy state of a driver using the drowsy pattern detection module 40 will be described with reference to FIGS. 2 to 4.

Referring first to FIG. 2, it may be appreciated that a heartbeat rate of a driver is suddenly increased and sudden steering is generated, based on timing ⓐ. That is, it is appreciated that understeering appears in the state in which the heartbeat rate of the driver is very low and then the heartbeat rate is suddenly increased, and at the same time a large and sudden steering pattern abruptly appears. This may be considered to be a situation in which a driver falls asleep at the wheel (i.e., while driving) for a short period of time and then wakes up and is temporarily tensioned. Therefore, when the heartbeat signal and the vehicle signal appear the pattern as illustrated in FIG. 2, the drowsy pattern detection module 40 determines this state in the drowsy driving state to transmit the warning signal to the warning module 50 and output a warning against the drowsy driving to the driver. In this case, a reference to determine the suddenly increasing degree of the heartbeat rate and the sudden steering degree may be set in advance at the time of designing the system. Further, the reference for the low heartbeat rate corresponding to the drowsy state may be set in advance at the time of designing the system.

Further, the case of ⓑ is a situation in which the drowsy driving like ⓐ is sensed and then the heartbeat rate is again reduced to a constant value or less. In this case, the drowsy pattern detection module 40 may output a guide speech recommending rest and a warning against the drowsy driving to a driver regardless of a driving pattern depending on the vehicle signal.

Referring to FIG. 3, it may be appreciated that the heartbeat rate of the driver is suddenly increased based on timing ⓐ and the steering of a zigzag pattern disappears. That is, it may be appreciated that the sudden change in the width position (i.e., zigzag pattern due to lane tracking failure) occurs in the state in which the heartbeat rate of the driver is low, and then the heartbeat rate is suddenly increased and at the same time the pattern tracking a normal lane appears. As illustrated in FIG. 2, this may be considered to be a situation in which a driver falls asleep at the wheel and then wakes up and is temporarily tensioned. Therefore, when the heartbeat signal and the vehicle signal appear the pattern as illustrated in FIG. 3, the drowsy pattern detection module 40 determines this state in the drowsy driving state to transmit the warning signal to the warning module 50 and output a warning against the drowsy driving to the driver.

Further, the case of ⓑ is a situation in which the drowsy driving like ⓐ is sensed and then the heartbeat rate is again reduced to a constant value or less. In this case, the drowsy pattern detection module 40 may output a guide speech recommending rest and a warning against the drowsy driving to a driver regardless of a driving pattern depending on the vehicle signal.

Referring to FIG. 4, it may be appreciated that the heartbeat rate of the driver is suddenly increased and the long eye closing pattern disappears, based on timing ⓐ. That is, it may be appreciated that the long eye closing pattern is generated more than a preset frequency in the state in which the heartbeat rate of the driver is low and then the heartbeat rate is suddenly increased and at the same time the long eye closing pattern disappears. This may be considered to be a situation in which a driver falls asleep at the wheel and then wakes up and then is temporarily tensioned. Therefore, when the heartbeat signal and the eye closing signal appear the pattern as illustrated in FIG. 4, the drowsy pattern detection module 40 determines this state in the drowsy driving state to transmit the warning signal to the warning module 50 and output a warning against the drowsy driving to the driver.

Further, the case of ⓑ is a situation in which the drowsy driving like ⓐ is sensed and then the heartbeat rate is again reduced to a constant value or less. In this case, the drowsy pattern detection module 40 may output a guide speech recommending rest and a warning against the drowsy driving to a driver regardless of a driving pattern depending on the vehicle signal.

As described above, the present disclosure may more accurately determine whether the driver falls asleep at the wheel using the heartbeat signal of the driver and the vehicle signal or the eye closing signal. According to the embodiments of the present disclosure, it is possible to more accurately determine the drowsy state of the driver using the vehicle signal, the image signal, and the heartbeat signal of the driver The embodiments of the present disclosure described above have been provided for illustrative purposes. Therefore, those skilled in the art will appreciate that various modifications, alterations, substitutions, and additions are possible without departing from the scope and spirit of the disclosure as disclosed in the accompanying claims and such modifications, alterations, substitutions, and additions fall within the scope of the present disclosure.

What is claimed is:

1. A system for determining a drowsy state of a driver, the system comprising:
    a heartbeat measurement module configured to detect a heartbeat rate of the driver and output a heartbeat signal corresponding to the detected heartbeat rate;
    a vehicle signal measurement module configured to measure a driving state of a vehicle being driven by the driver and output a vehicle signal corresponding to the measured driving state;
    a drowsy pattern detection module configured to determine whether a driver has fallen asleep while driving based on the heartbeat signal and the vehicle signal and output a warning signal as a drowsy warning in response to determining that the driver has fallen asleep while driving; and
    a warning module configured to output a warning to the driver based on the warning signal,
    wherein the drowsy pattern detection module is configured to determine whether a driver has fallen asleep considering a correlative changing pattern between the heartbeat rate based on the heartbeat signal and a level of steering based on the vehicle signal.

2. The system according to claim 1, wherein the drowsy pattern detection module is further configured to output the warning signal when an indication that the level of steering is less than a preset level appears in a state in which the heartbeat rate of the driver is less than a preset level and then is suddenly increased greater than the preset level and the level of steering is greater than the preset level.

3. The system according to claim 2, wherein the drowsy pattern detection module is further configured to output the warning signal regardless of the vehicle signal when the heartbeat rate of the driver is suddenly increased greater than the preset level and the level of steering is greater than the preset level and then the heartbeat rate is again reduced less than a preset numeric value.

4. The system according to claim 1, wherein the drowsy pattern detection module is further configured to output the warning signal when a zigzag pattern appears due to a lane tracking failure in a state in which the heartbeat rate of the driver is less than a preset level and then a normal pattern of tracking a lane appears while the heartbeat rate is suddenly increased greater than the preset level.

5. The system according to claim 4, wherein the drowsy pattern detection module is further configured to the warning signal regardless of the vehicle signal when the driver normally tracks the lane while the heartbeat rate of the driver is suddenly increased greater than the preset level and then the heartbeat rate is again reduced less than a preset numeric value.

6. A system for determining a drowsy state of a driver, the system comprising:
    a heartbeat measurement module configured to detect a heartbeat rate of the driver and output a heartbeat signal corresponding to the detected heartbeat rate;
    a driver photographing module configured to measure a degree of eye closing of the driver and output an eye closing signal indicating the measured eye closing degree;
    a drowsy pattern detection module configured to determine whether the driver has fallen asleep while driving based on the heartbeat signal and the eye closing signal and output a warning signal as a drowsy warning in response to determining that the driver has fallen asleep while driving; and
    a warning module configured to output a warning to the driver based on the warning signal,
    wherein the drowsy pattern detection module is configured to determine whether a driver has fallen asleep considering a correlative changing pattern between the heartbeat rate based on the heartbeat signal and a long eye closing pattern based on the eye closing degree.

7. The system according to claim 6, wherein the drowsy pattern detection module is further configured to output the warning signal when the long eye closing pattern is greater than a preset frequency in a state in which the heartbeat rate of the driver is less than a preset level and then the long eye closing pattern disappears while the heartbeat rate is suddenly increased greater than the preset level.

8. The system according to claim 7, wherein the drowsy pattern detection module is further configured to output the warning signal regardless of a vehicle signal when the long eye closing pattern disappears while the heartbeat rate of the driver is suddenly increased greater than the preset level and then the heartbeat rate is again reduced less than a preset numeric value.

9. A method for determining a drowsy state of a driver, the method comprising:
    measuring a heartbeat rate of the driver and a driving state of a vehicle being driven by the driver; determining whether the driver has fallen asleep while driving based on the heartbeat rate and the driving state; and outputting a warning when it is determined that the driver has fallen asleep while driving,
    wherein the determining includes determining whether the driver has fallen asleep considering a correlative changing pattern between the heartbeat rate and a level of steering based on the vehicle signal.

10. The method according to claim 9, wherein the determining of whether the driver has fallen asleep while driving comprises:
    determining that the driver has fallen asleep while driving when an indication that the level of steering is less than a preset level appears in a state in which the heartbeat rate of the driver is less than a preset level and then is suddenly increased greater than the preset level and the level of steering is greater than the preset level.

11. The method according to claim 9, wherein the determining of whether the driver has fallen asleep while driving comprises:
    determining that the driver has fallen asleep while driving when a zigzag pattern appears due to a lane tracking failure in a state in which the heartbeat rate of the driver is less than a preset level and then a normal pattern of tracking a lane appears while the heartbeat rate is suddenly increased greater than the preset level.

12. The method according to claim 9, wherein the measuring comprises:
    photographing eyes of the driver and outputting a photographed image signal corresponding to the photographed eyes; and
    analyzing the photographed image signal to measure an eye closing degree of the driver.

13. The method according to claim 12, wherein the determining of whether the driver has fallen asleep while driving comprises:
    determining that the driver has fallen asleep while driving when a long eye closing pattern is greater than a preset frequency in a state in which the heartbeat rate of the driver is less than a preset level and then the long eye closing pattern disappears while the heartbeat rate is suddenly increased greater than the preset level.

\* \* \* \* \*